Patented Sept. 13, 1927.

1,642,244

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING SODIUM PHOSPHATES.

No Drawing.   Application filed October 31, 1922. Serial No. 598,212.

The usual process in use at the present time for making disodium phosphate consists in treating ground phosphate rock with sulfuric acid, separating the resulting solution containing phosphoric acid from undissolved residue, and converting the phosphoric acid content of the solution to the disodium salt by adding to the solution two molecules of sodium carbonate in the form of soda ash to each molecule of phosphoric acid in the solution. This treatment with soda ash results in the precipitation of a number of impurities present in the solution which are removed by filtration. The clear solution which is hot and concentrated is then run into crystallizers and disodium phosphate is crystallized out. The process thus far is simple and easily carried out, but difficulties arise in the recovery of the phosphate content of the mother liquor. The mother liquor is highly colored by impurities derived from the phosphate rock, and in order to recover the sodium phosphate content of the mother liquor it is necessary to boil the liquor up separately, crystallize out disodium phosphate which is highly colored, redissolve the colored crystals in water and recrystallize.

The mother liquor from the second crystallization is still more highly colored and concentrated in impurities than the first mother liquor, and the recovery of its phosphate content requires a more complicated treatment. Moreover, the phosphate crystals obtained by the above described procedure are not absolutely white, but are more or less colored, due to the presence of small amounts of impurities which they contain.

In the usual process of making trisodium phosphate the phosphoric acid solution obtained ordinarily by treating phosphate rock with sulfuric acid is treated with soda ash sufficient to form the disodium phosphate, as in the manufacture of disodium phosphate. Then in order to form the trisodium salt, the solution is treated with caustic soda. The solution after the addition of the soda ash or after the addition of caustic soda or at both points in the process, is settled or filtered to remove precipitated impurities, and is then run to crystallizers where a first crop of trisodium phosphate crystals is separated. The mother liquor is then concentrated and crystallized a second time, whereby a second crop of crystals of inferior quality is obtained. This second crop of crystals must be redissolved and recrystallized. The second mother liquor being highly colored cannot be used directly for the production of further crops of phosphate crystals, but must be run back into the disodium phosphate liquor in the earlier stage of the process, causing thereby a loss of the relatively expensive caustic soda used in the formation of the trisodium salt. In this process as in the process of making disodium phosphate described above, the products are not absolutely white.

I have found that by treating the solutions or liquors prior to crystallization of the sodium phosphate salts with a decolorizing agent products may be obtained which are white in appearance and materially better looking than the crystals obtained by the old process described above, and in addition the recrystallizing operations are eliminated, as a result of which the amount of water and the heat required in the process are materially reduced.

The preferred decolorizing agent which I have found for use in the process is chlorine which is conveniently obtained and used in the form of compressed or liquid chlorine. The chlorine may be applied to the solution of phosphoric acid or salt thereof in any suitable manner as will be well understood, it being advisable of course to employ some method which will efficiently accomplish the absorption of the chlorine in the solution. The quantity of chlorine to be employed in any particular instance will of course depend upon the quantity and kind of impurities present and the degree of decolorization desired.

The decolorizing operation may be carried out at any suitable point in the process. For instance, chlorine may be introduced into the crude phosphoric acid solution obtained by the treatment of phosphate rock or other phosphate containing material with acid, or the decolorizing treatment may follow the treatment with soda ash, or it may follow the treatment with caustic soda, or it may be applied to the mother liquors resulting from one or more of the crystallizing operations. It follows also that the treatment with chlorine may take place at more than one point in the process, and in fact at any point in the process where decolorization of the solution under treatment is desired.

My preferred procedure is to decolorize the solution of disodium phosphate produced in the usual way by treating the crude phosphoric acid solution with soda ash and separating the precipitated impurities by filtration.

It will be understood that, while the invention is described in connection with the production of disodium and trisodium phosphate because the production of these two salts affords at the present time the largest commercial use of the process, the invention is not limited to processes in which these two salts are made, but may be applied in the manufacture of other phosphate salts or in the manufacture of decolorized phosphoric acid or solutions thereof.

I claim:

1. Process which comprises treating a solution containing colored impurities, which impurities are substantially identical with those found in a crude solution of phosphoric acid obtained by treating ground phosphate rock with sulfuric acid and separating the resulting solution from the undissolved residue, and an oxygen-containing pentavalent phosphorus compound with chlorine.

2. In processes of making phosphates involving the crystallization thereof from solutions containing the same and colored impurities which impurities are substantially identical with those found in a crude solution of phosphoric acid obtained by treating ground phosphate rock with sulfuric acid and separating the resulting solution from the undissolved residue, the step which consists in treating said solutions with chlorine.

3. Process which comprises treating a crude solution of phosphoric acid containing colored impurities, which impurities are substantially identical with those found in a crude solution of phosphoric acid obtained by treating ground phosphate rock with sulfuric acid and separating the resulting solution from the undissolved residue, with soda ash and thereafter treating the solution with chlorine.

4. Process which comprises treating a crude solution of phosphoric acid containing colored impurities, which impurities are substantially identical with those found in a crude solution of phosphoric acid obtained by treating ground phosphate rock with sulfuric acid and separating the resulting solution from the undissolved residue, with soda ash, separating precipitated impurities, and thereafter treating the solution with chlorine.

5. Process which comprises treating a crude solution of phosphoric acid containing colored impurities, which impurities are substantially identical with those found in a crude solution of phosphoric acid obtained by treating ground phosphate rock with sulfuric acid and separating the resulting solution from the undissolved residue, with soda ash, thereafter treating the solution with caustic soda and thereafter treating the solution with chlorine.

6. Process which comprises treating a crude solution of phosphoric acid containing colored impurities, which impurities are substantially identical with those found in a crude solution of phosphoric acid obtained by treating ground phosphate rock with sulfuric acid and separating the resulting solution from the undissolved residue, with soda ash, separating precipitated impurities, crystallizing sodium phosphate and thereafter treating the solution with chlorine.

7. Process which comprises treating a crude solution of phosphoric acid containing colored impurities, which impurities are substantially identical with those found in a crude solution of phosphoric acid obtained by treating ground phosphate rock with sulfuric acid and separating the resulting solution from the undissolved residue, with soda ash, thereafter treating the solution with caustic soda, crystallizing sodium phosphate and thereafter treating the solution with chlorine.

8. Process which comprises treating a crude solution of phosphoric acid containing colored impurities which impurities are substantially identical with those found in a crude solution of phosphoric acid obtained by treating ground phosphate rock with sulfuric acid and separating the resulting solution from the undissolved residue, with a basic alkali metal compound, separating precipitated impurities, subjecting the solution to crystallization, treating the solution with chlorine and again subjecting the solution to crystallization.

In testimony whereof, I affix my signature.

HENRY HOWARD.